United States Patent
Ward

(10) Patent No.: US 6,841,752 B2
(45) Date of Patent: Jan. 11, 2005

(54) WIRE FEED SPEED ADJUSTABLE WELDING TORCH

(76) Inventor: Joseph J. Ward, 221 Independence Ct., Collegeville, PA (US) 19426

( * ) Notice: Subject to any disclaimer, the term of this patent is extended or adjusted under 35 U.S.C. 154(b) by 0 days.

(21) Appl. No.: 10/263,034

(22) Filed: Oct. 2, 2002

(65) Prior Publication Data

US 2003/0062354 A1 Apr. 3, 2003

Related U.S. Application Data

(60) Provisional application No. 60/326,542, filed on Oct. 2, 2001.

(51) Int. Cl.[7] .............................................. B23K 9/167
(52) U.S. Cl. ......................................... 219/75; 219/136
(58) Field of Search ............................ 219/137.71, 74, 219/75, 132, 136, 137.8, 137.9

(56) References Cited

U.S. PATENT DOCUMENTS

| | | | | |
|---|---|---|---|---|
| 2,571,684 A | * | 10/1951 | Craven | 219/75 |
| 2,710,902 A | * | 6/1955 | Pilia | 219/74 |
| 2,723,331 A | * | 11/1955 | Tyrner | 219/137.71 |
| 2,778,099 A | * | 1/1957 | Anderson et al. | 219/137.8 |
| 2,833,912 A | * | 5/1958 | Royer | 219/137.9 |
| 3,609,291 A | * | 9/1971 | Pilia et al. | 219/137.71 |
| 3,940,586 A | * | 2/1976 | Stearns et al. | 219/136 |
| 4,357,515 A | * | 11/1982 | Kiefer et al. | 219/75 |
| 5,789,717 A | * | 8/1998 | Imaizumi et al. | 219/136 |
| 6,225,596 B1 | * | 5/2001 | Chandler et al. | 219/137.71 |

* cited by examiner

Primary Examiner—Clifford C. Shaw
(74) Attorney, Agent, or Firm—Robert B. Famiglio; Famiglio & Associates

(57) ABSTRACT

An arc welding torch accessory providing automatic material feed to an existing TIG torch, which has user adjustable wire feed speed without discontinuing use of the device. The welding torch device is employed in gas delivery arc welding devices which use hyperbaric welding techniques to evacuate air or oxygen from the weld area while the weld is being processed. The disclosure describes a system for adopting an automatic wire feed system to an existing TIG welding torch head. The device allows automatic delivery of wire material, commonly fed by hand in arc welding, by presenting the wire to be fed automatically while allowing the arc welding torch operator to adjust the quantity of material feed while actually in the process of welding. The apparatus provides for user speed adjustable controls to be operated by a foot pedal device or similar means which would allow the operator of the welding torch to continue the operation during the adjustment process and eliminates the need for the operator to cease the welding operation while adjustment of the material feed delivery speed is undertaken.

2 Claims, 2 Drawing Sheets

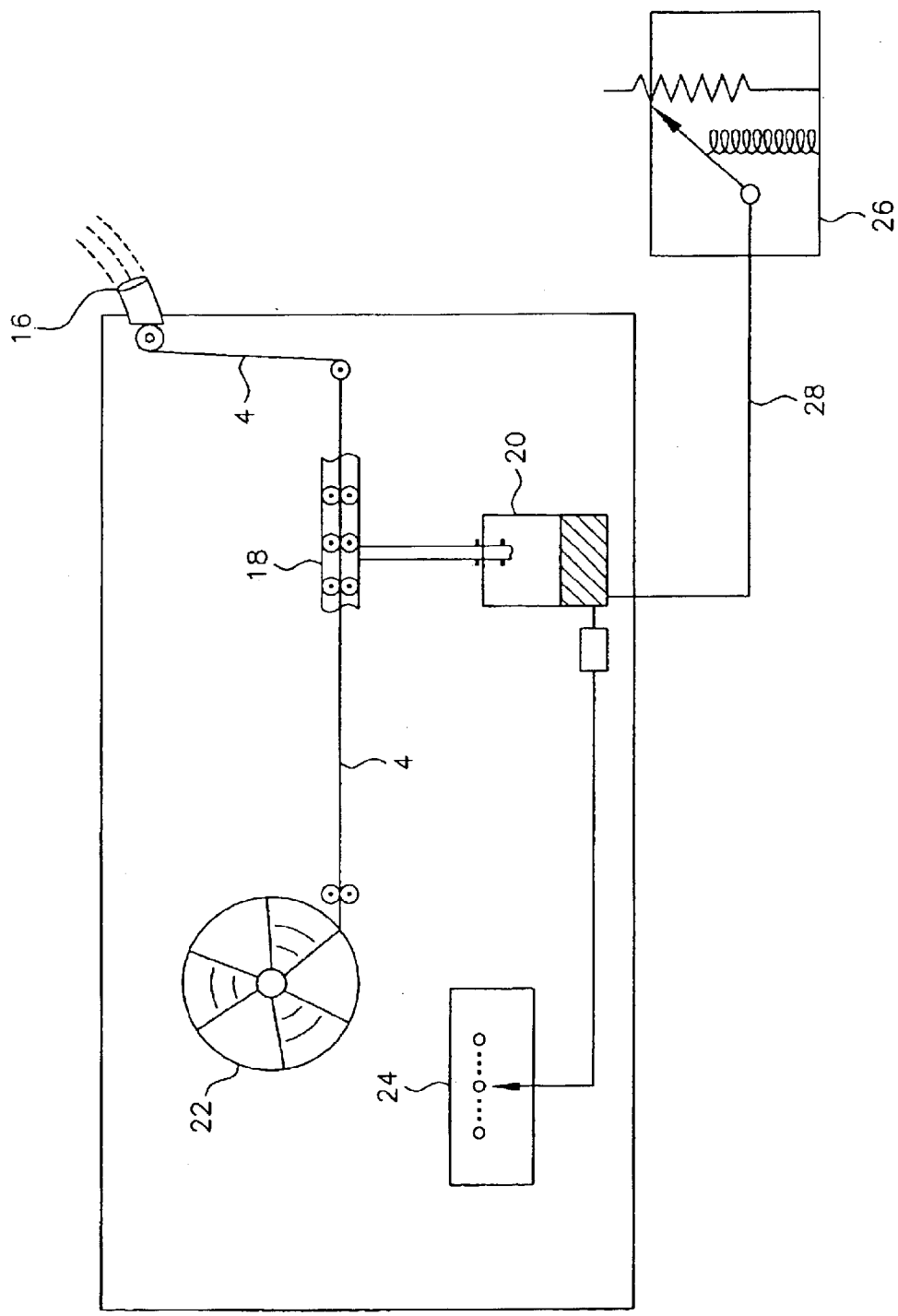

WIRE FEED SPEED ADJUSTABLE WELDING TORCH

CROSS REFERENCES TO RELATED APPLICATIONS

This application claims the benefit of the applicant's provisional application, Ser. No. 60/326,542 which was filed Oct. 2, 2001.

BACKGROUND OF THE INVENTION

1. Field of the Invention

The present invention relates to arc welding apparatus, and more particularly to TIG welding apparatus wherein welding wire is automatically supplied for TIG welding. The present invention provides a means for a portable wire feed system to automatically deliver welding wire to any TIG torch, with an adjustment mechanism that provides for a pedal or other control device that can increase or decrease the speed of delivery of the feed wire during the welding operation.

2. Description of the Related Art

TIG welding is used for welding all types of metals in a wide variety of fields, such as manufacturing, ship building, pipe fitting or any other metal work. TIG welding techniques are well known, and typical apparatus uses a manual TIG torch wherein an arc is generated between the torch electrode and the base metal, and a welding wire is applied to feed material into the seam being welded during the welding operation. TIG welding techniques require the torch operator to hand feed wire material, presently most commonly available in $3/32"$, $1/8"$ and $5/32"$ diameters. A typical welder may cut the wire into strips of approximately three feet so that the wire may be conveniently hand manipulated and not be of excessive weight or be of an unmanageable size.

Another common type of welding torch is a MIG torch which has an automatic wire feed mechanism wherein the wire also serves as the welding electrode or tip. The arc is generated between the automatically fed wire which protrudes through the center of the welding torch head and supports an arc between the wire and the object being welded. While such apparatus does provide for an automatic wire feed through the center gas cup of the torch, the apparatus is not portable, the welding torch head cannot be remotely located more than perhaps twenty-five feet from the welding machine or apparatus, and the MIG system provides other disadvantages.

Present TIG welding tools do not provide for an automatic or integrated application of welding wire to an existing TIG torch and torch handle, or for adjustability of the speed of the wire being fed to the head of the torch. Existing MIG types of welding equipment requires that the operator discontinue the welding operation and then adjust the rate of delivery of the material wire to a more suitable speed. Generally, this requires the operator to reach for a control panel which may or may not be located in close proximity to the work being performed.

Present equipment available today, which provides for automatic wire fee in a TIG torch operation, usually requires more than one operator, who must be specially trained, to operate large, expensive welding systems that cannot be adapted to any standard TIG torch or welding machine. An example of what may be found in the prior art is disclosed in U.S. Pat. No. 5,789,717, issued to Imaizumi et al for a Semi-Automatic TIG Welding Apparatus. This patent teaches an apparatus to feed welding wire to the vicinity of the arc tip of the welder and presents the wire material through the welder handle grip along with mechanisms to feed the other required supply lines as illustrated in the referenced patent. As is evident from the disclosure in Imaizumi, the welding wire feed mechanism is not adapted to be used with existing, conventional TIG touch handles. Imaizuni contemplates an integrated solution to the need for one handed TIG torch operation as is evident by the illustrations and the disclosure in said patent.

None of the equipment found in the existing art provides for a simple, portable means to automatically deliver wire to any standard TIG torch where the operator can continually adjust, regulate or otherwise control the feed speed of the wire being used in the welding process. The existing art does not provide for a simple means to adapt a TIG welding torch with a welding wire feed mechanism which is also capable of wire feed speed control and does not require altering or permanently modifying the existing torch to allow operation.

SUMMARY OF THE INVENTION

The present invention provides a means to adapt a portable wire fee mechanism to a standard TIG torch where the operator can control the speed of delivery of the welding wire. The invention provides for a user controlled speed adjustment to allow the user of the TIG welding apparatus to increase or decrease the speed of the material delivery to the weld point without discontinuing the welding operation. The invention eliminates the need for the torch operator to hand feed welding wire to the seam being welded. The control device can include a foot pedal, a clamp on trigger mechanism, or other control handle means which will allow the operator to increase or decrease the wire material delivery speed without the need to dedicate one of the operators hands to the speed control device.

Accordingly, it is the object of the present invention to provide a TIG welding apparatus accessory wherein the user can adopt an automatic wire feeding mechanism to a TIG torch handle.

It is also the object of the present invention to provide a means to freely adjust the delivery speed of the welding wire or material simultaneously while conducting a welding operation with a TIG style welding torch.

It is another object of the present invention to provide a means and apparatus to adapt any standard TIG torch with an automatic wire feed system using existing TIG torch apparatus.

It is yet another object of the present invention to provide a means to adjust the delivery rate of the welding wire in a TIG welding apparatus by manipulation of a user control which is available to the user without discontinuing the welding operation or releasing the welding head handle.

It is a further object of the present invention to provide a means to adjust the speed of the welding wire material delivery simultaneously while conducting the welding operation.

BRIEF DESCRIPTION OF THE DRAWINGS

FIG. 2 is a diagram showing the preferred embodiment of the apparatus which feeds welding wire to the torch wire feed tube utilizing a motor speed control device to provide adjustable delivery rate of the wire spool used in TIG welding.

DETAILED DESCRIPTION OF THE PREFERRED EMBODIMENT

Figure 1:
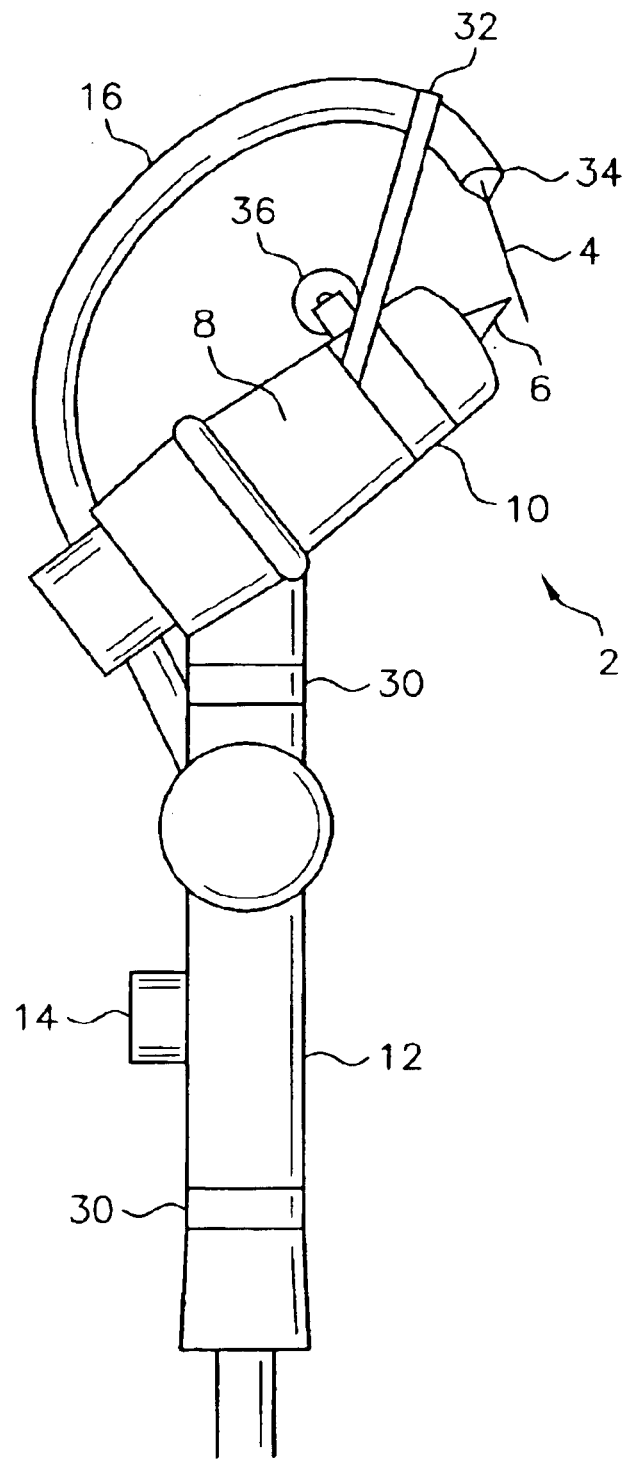
FIG. 1 is a view of the TIG Welding Torch illustrating the wire-feeding curved nozzle attached to a welding torch head at the welding point where the material wire is delivered in the proximity of the arc welding electrode.

And now the invention will be described in detail, with reference to the various figures in which like numerals refer to like parts.

Turning now to FIG. 1, a TIG Welding Torch 2 is shown in a conventional configuration, along with the invention attached. Feed wire 4 is delivered through wire feed tube 16 to close proximity of arc tip 6 where an electrical arc causing the welding process initiates. Hyperbaric TIG Welding, also known as Gas Tungsten Arc Welding is widely used as a technique for making the root pass and some subsequent passes in manual hyperbaric welding procedures. An automatic feed welding torch, sometimes commonly known as a MIG which provides for the automatic feed of feed wire through the center of the gas cup and the wire being fed is used as the arc electrode. The wire in a MIG welder is consumed in the welding process. A MIG welder has a preselected delivery rate of the wire to the joint to be welded. In both MIG and TIG welders, a stream of inert gas, such as argon, is delivered to the weld area through gas cup 8 which assists in evacuating any air containing oxygen from the close proximity to the weld site thereby eliminating certain problems, as is well known to those skilled in the art of arc welding.

In a TIG welding device, the inert gas delivered through handle 12 to the gas cup 8 may be adjusted through valve 14 such as the delivery rate of the inert gas is satisfactory to the operator.

In most existing TIG welders, welding wire is usually applied by hand. The welding operator will normally cut strips of welding wire, most commonly found in the diameters of 3/32", 1/8", or 5/32", into short strips so that they may be manipulated freely by the welder. The welding material wire is applied to the joint and used as welding material which is melted by the arc from the electrode to the grounded metal. Unlike a MIG welding device, electrode 6 is not consumed in the welding process and therefore, no automatic wire feed mechanisms have been applied to feed a wire through the center of gas cup 8 in a TIG welding torch. Welding wire used in TIG welding in the above diameter has sufficient stiffness and rigidity to be self-supporting in the strips cut by the welding operator. In existing MIG welders, welding wire is normally supplied in dimensions such as 0.030", 0.035", 0.040" and other similar small diameters. As such, welding wire used in such operations is more highly flexible and does not have the rigidity necessary to allow an operator to feed the wire by hand using a TIG torch.

The present invention provides for a means to clamp on an automatic wire feed mechanism, as shown in FIG. 1, which also allows for an adjustment of the speed of delivery of wire 4 through tube 16. The wire feed speed of a MIG torch is pre-selected by the operator and is not adjustable in the welding process. If the operator of a MIG welding device desires to change the delivery rate of the material wire, normally they would stop the welding operation, move to the control device on the welding machine normally located a certain distance from the welding head, and turn the speed up or down. In a MIG machine, because of the wire feed mechanism and the fact that the wire also is the electrode for carrying the current to conduct the welding operation, the welding torch head cannot be further than approximately than twenty-five feet from the welding apparatus. Otherwise, malfunctions occur, there are practical problems in the wire feed mechanism because of longer distances, and the results have been generally unsatisfactory. In a TIG welding machine, torch 2 can be, and is frequently located many hundreds of feet from the welding machine itself. A gas line and electric current wire are routed from a typical welding machine up through a structure or job where the welding operation is being conducted. A welding operator will carry welding wire to the site of the welding operation and conduct the welding in a conventional fashion.

With the present invention, however, a portable device the size of approximately a briefcase or catalog case can contain a spool of welding wire of the desired size, adopted to be fed through a wire feeding device driven by a simple electric, speed controlled motor. The device can operate on conventional 120 volt power or 12 volt portable battery power and may be co-located with the welding torch 2 at the location of the welding operation. The present invention, in the preferred embodiment, provides a speed control pedal 26 which may be remotely located from the wire spool or the automatic feed equipment so that the operator of welding torch 2 can increase or decrease the delivery speed of the wire material while continuing the welding process.

FIG. 2 illustrates the apparatus used in the preferred embodiment. The apparatus as disclosed provides motor 20 which drives wire feed rollers 18. Rollers 18 is a feed device for material wire 4 which allows the transmission of wire 4 through wire feed tube 16 so that the wire may be presented in the area of the welding arc where the material is needed. An important aspect of the invention is the ability of the operator of the device to control the speed of wire 4 utilizing variable motor speed control pedal 26, employing the entire system on an existing TIG welder. Pedal 26, connected to motor 20 by cable 28, presents the control information from pedal 26 to the variable speed control of motor 20. It will be appreciated by those skilled in the art that a simple electric motor can be designed with a variable speed control which allows the motor speed to be continually adjusted while the torque output of the motor remains uniform or constant at any given speed. Variable speed electric drills are commonplace example of the type of motor speed control devices which would function well in the application presented. Much like a variable speed electric drill, it should be appreciated that pedal 26 may also take the form of a thumb or finger controlled trigger which is attached to handle 12 and connected to motor 20 by an external control cable leading to the handle, similar to cable 28 in FIG. 2. In such a fashion, the speed control means represented at 26 in FIG. 2 could take the form of a trigger-like or a button-like control mechanism which provides the same function as pedal 26, but which otherwise allows the operator to control the feed speed of the wire through a hand control rather than a foot control. Different operators will prefer different control configurations depending on the situation and the environment in which the welding operation is taking place.

The welding apparatus shown in FIG. 2 provides internal room for wire spool 22 to present the source of the welding wire 4 to be fed through roller 18. Wire spool 22 is most commonly provided in a four pound spool of welding wire on a plastic reel. As is presently used in MIG welding operations, spool 22 is presently available in a configuration which would lend itself well to a drop-in spool fixture which would allow the rotation of spool 22 about an axis to feed to wire 4 from spool 22 in a conventional fashion shown in FIG. 2.

It is also possible to have a master control speed selector 24 which provides for an overall range of speed to be ultimately controlled by pedal 26. For example, selector 24 can select a speed range from zero inches per minute to one inch per minute delivery rate for wire 4. Other selectable positions may provide for a range of zero inches per minute to three (3) inches per minute or zero per inches per minute to five (5) inches per minute. The wire speed selector provides the ability of the welding torch operator to have a large range of speed variation immediately available, or a slower speed with a more vernier range of control with foot pedal 26. The operator of the welding torch can engage in continual welding operations while adjusting the speed of delivery of wire 4 without switching the torch off or discontinuing the actual process. As described, the invention allows the operator to adjust the speed using a foot control while allowing both hands to be free to manipulate the work and to operate the torch simultaneously. Also, it can be appreciated that pedal 26 may be located at a distance from the wire feeding apparatus so that it is not necessary to operate the welding torch in close proximity to the welding wire material feeding device since pedal 26 is connected through cable 28 which may be of any reasonable length to allow easy movement of the pedal to the area where it is needed.

In order to make the invention available to existing TIG welders, it can be appreciated that the apparatus described in the present invention must clamp neatly onto welding head handle 12 and gas cup 8 of torch 2 show in FIG. 1. Clamps 30 are used to attach wire feed tube 16 to any convenient location on torch 2 to allow routing of wire 4 up through, and to the vicinity of arc tip 6. Though FIG. 1 illustrates clamp 30 located in two locations on handle 12, it is not necessary to place clamp 30 on handle 12 if the operator desires to dress feed tube 16 away from torch 2 in a different area or direction.

Wire tube hanger 32, clamped to gas cup 8 utilizing gas cup clamp 10, suspends tube 16 in the proximity of the output of gas cup 8 and arc tip 6 as can be seen in FIG. 1. Clamp fastener 36, a thumb wheel design or other type of finger adjustable fastening means provides convenience for the welding operator to adjust the configuration of wire feed tube 16 as may be desired. Wire tube exit tip 34 are similar to the nozzle tips used on existing MIG welding torches which allow for wire 4 to fit though the center of tip 34 when exiting wire tube 16. Tip 34 is sized to correspond to the wire size desired by the welding operator. For example, if using welding wire sized at 0.035", tip 34 would provide a center opening which corresponds to use of such wire size so that wire 4 would travel neatly through the tip opening when being driven through tube 16 by the motor driven rollers 18 shown in FIG. 2.

It can also be appreciated that wire tube hanger 32, affixed to torch 2 with clamp 10 may be adjustable such that the distance between arc tip 6 and the end of wire 4 can be more easily controlled by the welding torch operator. Clamp fastener 36 can be of a thumbwheel control design such that manipulation of fastener 36 can control the spacing between arc tip 6 and wire 4 by ultimately causing slight movement in tube hanger 32 as shown in FIG. 1. Essentially, with manipulation of fastener 36 can control the distance between the arc being delivered to the weld site and welding wire 4 as it is presented to the point where welding is occurring.

It should also be appreciated by considering the description and the figures of the invention that speed control pedal 26 may be remotely located on welding head handle 12 so that the operator of torch 2 may adjust the speed of the delivery of welding wire 4 using a finger control such as those found on continuously adjustable speed drills or other hand tools. This would be advantageous in a welding operation where the welder was not in a convenient position to utilize a foot pedal such as earlier suggested.

The device shown in FIG. 2 may be configured in any convenient package which allows portability and co-location of the wire feed device in the general vicinity of the welding operation. Thus, the user of a TIG welding apparatus, located many hundreds of feet from the welding machine, may carry the wire feed mechanism to the location and within several minutes attach wire feed tube 16 to torch 2 as show in FIG. 1. With the above it has been demonstrated the concept and practical application of a wire feed, speed adjustable welding torch accessory which allows retro fitting an existing TIG torch for automatic feed with "hands free" operation.

Other useful adaptations of the present invention further include use of other attachment means to affix a welding wire feeding tube mechanism to an existing TIG torch handle. It can also be appreciated that adaption of a remote motor speed control means to adjust the feed speed of the welding wire could employ wireless control means, including infrared, radio frequency or other remote control means which are employed in control of a variety of consumer and commercial appliances and devices. Using such short range electronic speed control means would eliminate the need for control wires to be connected from the speed adjustment control device to the location of the apparatus containing the wire feed mechanisms.

Although the invention has been described in terms of the preferred embodiment and with particular examples that are used to illustrate carrying out the principals of the invention, it would be appreciated by those skilled in the art that other variations or adaptations of the principal disclosed herein, could be adopted using the same ideas taught herewith. Such applications and principals are considered to be within the scope and spirit of the invention disclosed and are otherwise described in the appended claims.

What is claimed is:

1. Apparatus for automatically feeding welding wire of the arc tip of a handheld TIG welding device comprising:
    a welding wire feeding tube disposed to dispense welding wire to the vicinity of the arc tip of said welding device;
    clamping means to affix said wire feeding tube to the welding device; and
    welding wire dispensing means including a reel of welding wire, a variable speed drive motor for dispensing said welding wire from said reel into said welding wire feeding tube, further including a speed control mechanism operatively connected to said drive motor to control the speed of dispensing said welding wire, wherein further said welding wire feeding tube disposed to dispense welding wire to the vicinity of the arc tip of said welding device dispenses said welding wire from a location opposite the location of the handle of the torch.

2. Apparatus for automatically feeding welding wire of the arc tip of a handheld TIG welding device comprising:
    a welding wire feeding tube disposed to dispense welding wire to the vicinity of the arc tip of said welding device;
    clamping means to affix said wire feeding tube to the welding device; and
    welding wire dispensing means including a reel of welding wire, a variable speed drive motor for dispensing said welding wire from said reel into said welding wire feeding tube, further including a speed control mechanism operatively connected to said drive motor to control the speed of dispensing said welding wire, wherein further said welding wire feeding tube disposed to dispense welding wire to the vicinity of the arc tip of said welding device dispenses said welding wire from a location opposite the location of the handle of the torch, wherein further said clamping means to affix said wire feeding tube to the welding device is attached to the torch head of the welding device in the vicinity of the arc tip of said torch.

* * * * *